June 21, 1960   F. W. CAMMANN   2,942,092
INTERNAL TUBE CUTTER
Filed Feb. 27, 1959   2 Sheets-Sheet 2
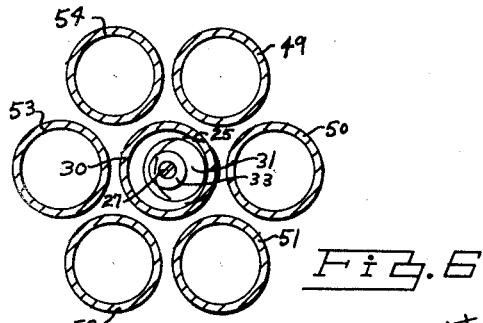
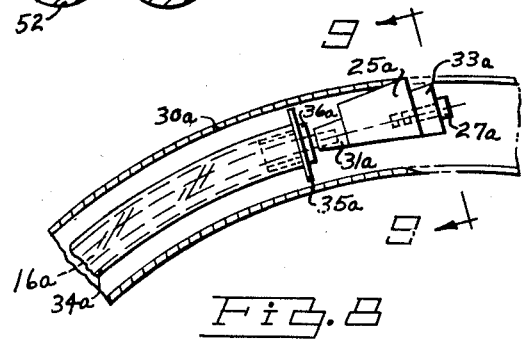
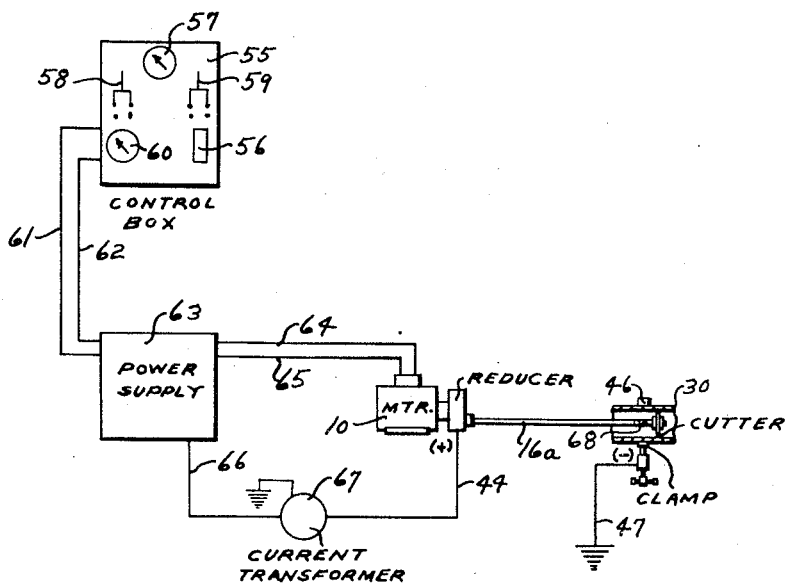
INVENTOR.
FRED W. CAMMANN
BY
Donnelly, Mentag & Harrington
ATTORNEYS

United States Patent Office 2,942,092
Patented June 21, 1960

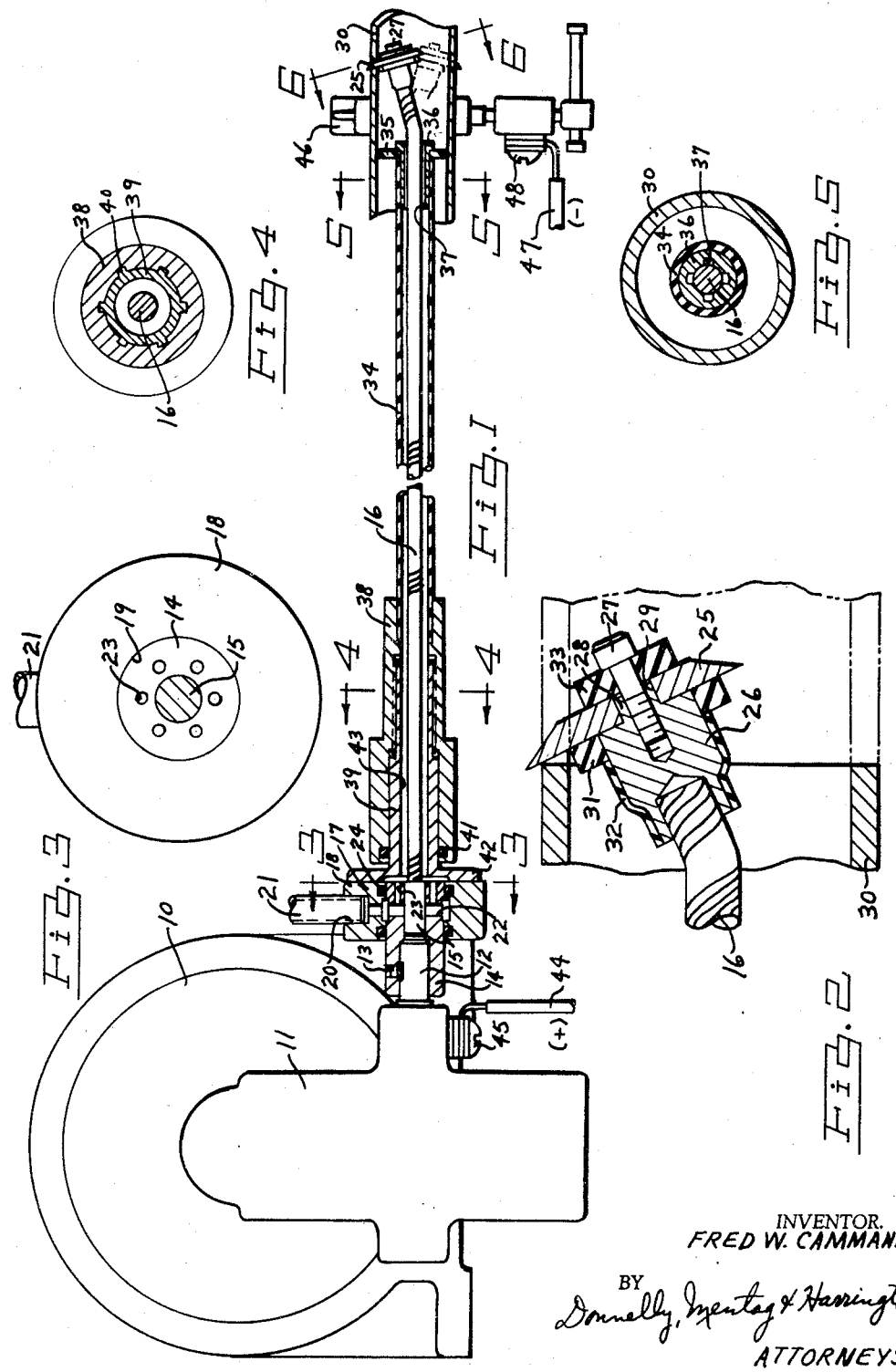

2,942,092

INTERNAL TUBE CUTTER

Fred W. Cammann, 2700 Henninger Road,
Cleveland, Ohio

Filed Feb. 27, 1959, Ser. No. 796,090

6 Claims. (Cl. 219—69)

This invention relates to a new and useful tube cutting device, and more particularly to a device which is adapted to cut the tube or pipe internally.

It is an important object of the present invention to provide a tube cutter which is capable of cutting a tube from the inside thereof so that a portion of the tube can be cut out and removed through inspection ports from objects such as heat exchangers, boilers, and the like, without damage to the surrounding tubes.

It is another object of the present invention to provide an internal tube cutter which employs a cutting wheel mounted on the end of a flexible shaft and which revolves in an off center manner which causes a centrifugal force that in turn forces the cutter against the inner surface of the tube and, by means of an electrical current and the force of the spinning cutting wheel against the inside of the tube, an arc is produced which causes disintegration, or break down of the tube.

It is a further object of the present invention to provide an internal tube cutter which is provided with means for insulating the cutting wheel thereof in such a manner so that the wheel will not burn and cut its way out of the tube and accidentally engage an adjacently disposed tube and cut it.

It is a further object of the present invention to provide an internal tube cutter which may be used to cut straight tubes or tubes having a radius or curved portion, and destroy same.

It is still another object of the present invention to provide an internal tube cutter of the class described which is simple and compact in construction, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 1 is a broken elevation view partly in section, of an internal tube cutter made in accordance with the principles of the invention;

Fig. 2 is an enlarged fragmentary elevational sectional view of the right end of the structure illustrated in Fig. 1;

Fig. 3 is an enlarged elevational sectional view of the structure illustrated in Fig. 1, taken along the line 3—3 thereof, and looking in the direction of the arrows;

Fig. 4 is an enlarged elevational sectional view of the structure illustrated in Fig. 1, taken along the line 4—4 thereof, and looking in the direction of the arrows;

Fig. 5 is an enlarged elevational sectional view of the structure illustrated in Fig. 1, taken along the line 5—5 thereof, and looking in the direction of the arrows;

Fig. 6 is an elevational view of the structure illustrated in Fig. 1, taken in the direction of the arrows 6 and showing the relationship of the tube being cut to the surrounding tubes;

Fig. 7 is a schematic view of a power supply circuit for an internal tube cutter made in accordance with the invention and showing a slightly modified tube cutter;

Fig. 8 is a fragmentary elevational view of the cutting end of a tube cutter showing a modified cutter and with the tube shown in section; and, Fig. 9 is an elevational sectional view of the structure illustrated in Fig. 8, taken along the line 9—9 thereof and looking in the direction of the arrows.

Referring now to the drawings, and in particular to Figs. 1 and 2, the illustrative embodiment of the invention comprises the variable speed driven motor 10 which is operatively connected to a suitable gear reducer 11 having the output shaft 12. As shown in the application, the motor 10 is an electric motor, but it will be understood that other suitable motors may be used, as for example an air motor. As shown in Fig. 1, the output shaft or drive shaft 12 is fixedly secured by means of the lock screw 13 to one end of the rotating coupling member 14. Fixedly mounted in the other end of the rotating coupling sleeve 14 is the driven end 15 of the flexible shaft 16 which has a suitable core made of steel or copper for electrical conductance. The end 15 of the flexible cable 16 would be fixedly mounted in the coupling member 14 by any suitable means, as by means of a press fit, or fixture.

Mounted around the outer end of the rotating coupling member 14 is a non-rotating coupling member, generally designated by the numeral 17. The non-rotating coupling member 17 includes the ring portion 18 which has the hole 19 therethrough for the reception of the rotating coupling member 14. The coupling ring 18 is provided with the inlet hole 20 on the upper side thereof in which is fixedly mounted the coolant supply tube 21 which is adapted to supply cutting fluid to the cutting device. Any suitable coolant may be used such as air, water, and the like. The inlet hole or port 20 communicates with the annular passage 22 formed in the outer end of the coupling member 14. The annular passage 22 communicates with a plurality of coolant passages 23 which are formed in the coupling member 14 around the shaft end 15, as shown in Fig. 3. The coupling ring 18 is provided with a plurality of O ring seals 24, as shown in Fig. 1.

As shown in Figs. 1 and 2, a cutter wheel 25 is fixedly mounted on the outer end of a metal body 26 which is made from a suitable electrical conductor, as copper. The body 26 is fixedly mounted on the outer end of the flexible shaft 16 by any suitable means. The cutter 25 is fixedly secured to the body 26 by means of the plastic screw 27. The body 26 is provided with the hub 28 on the outer end thereof and this hub is adapted to be received in the hole 29 formed in the cutter 25. The hole 29 is formed at an off center position in the cutter 25 so that when the shaft 16 is rotated, an unbalanced condition is created and the centrifugal force created thereby will cause the cutter to move outwardly into engagement with the tube, as 30, which is to be cut. It will be understood that the reverse procedure could be used, that is, the mounting hole in the cutter could be on-center and the hub 28 could be formed off center relative to the body 26. The cutter 25 is prevented from projecting too far beyond the tube 30 so as to accidentally hit any adjacent tube, by means of the insulator plastic ring 31 which is mounted around the body 26 adjacent the rear face of the cutter 25. The body 26 is also provided with an insulated covering as 32. A further insulating ring 33 is mounted on the front face of the cutter 25 and is held in place by the screw 27.

Mounted around the outer end of the flexible shaft is the plastic cover or sleeve 34, the outer end of which is turned outwardly to form an annular pilot flange 35 for guiding the cutter in the tube 30. The flexible covering 34 carries a core supporting bushing 36 in the forward end thereof which is provided with a plurality of radially disposed longitudinal coolant passage grooves 37, as shown in Fig. 5. The rear end of the flexible shaft covering 34 is fixedly mounted in the adjusting sleeve 38 which is slidably mounted on the fixed sleeve 39. As shown in Fig. 4, the adjusting sleeve 38 is radially fixed to the stationary sleeve 39 by means of the splines 40 which mate in suitable grooves in the sleeve 38. The O ring 41 in the rear end of the movable adjusting sleeve 38 provides a seal between the sleeves 38 and 39. As shown in Fig. 1, the rear end of the sleeve 39 is provided with the flange 42 which abuts the front end of the coupling ring 18. The sleeve 39 is provided with a coolant passage 43 therethrough which communicates with the passages 23 in the coupling ring 18.

As shown in Fig. 1, an electrode cable 44 is fixedly mounted by means of the screw 45 to the gear reducer 11 for feeding a current through the gear reducer, the shafts 12 and 16, and thence to the cutter 25. The tube 30 which is to be cut would have mounted thereon a clamp as 46 which would be grounded by means of a conductor cable 47 which is connected to the clamp by means of the screw 48.

In operation, the motor 10 would drive the shaft 12 which in turn drives the shaft 16 through the coupling means 14. The cutter 25 will thence be rotated and, because of its off center mounting, it will be thrown outwardly by centrifugal force against the inside of the tube 30. When the cutter 25 contacts the tube 30 the circuit will be completed from the cutter back through the clamp 46 to ground, whereby an arc will be created which will cause disintegration of the metal tube 30. The outward movement of the cutter 25 may be regulated by means of the sleeve 38 which can be moved longitudinally of the shaft 16 to vary the distance between the pilot 35 and the cutter 25. As the shaft 16 is rotated, the cutter 25 will be moved from the solid line position shown in Figs. 1 and 2 to the dotted line position shown in Fig. 1 and back to the solid line position, and so forth. The rotating cutter 25 thus functions as a rotary wheel electrode. The screw 27 could also be a metal screw covered with suitable insulation. During the cutting period, coolant in the form of air, gas, oil or the like would be conducted from a suitable source through the tube 21 and into the annular passage 22. The passages 23 then conduct the coolant into the passage 43 in the sleeve 39 from whence it flows through the tube 34 and out the grooves 37 and into an operative cooling engagement with the cutting wheel 25.

Fig. 6 illustrates the function of the insulating plastic ring 31 and how it abuts the inside of the tube 30 to prevent the cutter 25 from accidently hitting an adjacent tube, as anyone of tubes 49 through 54 which represent the disposition of tubes in a heat exchanger or the like.

Fig. 7 illustrates a schematic power arrangement adapted for use with an internal tube cutter device made in accordance with the invention and showing a solid cutter shaft 16a having a flexible end 68 instead of an all flexible shaft as 16. The numeral 55 indicates a power control box of any conventional type and which would be provided with a 110 volt power input plug as 56 which may be connected to any suitable source of 110 volt power. Numeral 57 indicates an ampere meter for indicating the wheel contacts in the tube 30. Switch 58 is the "on" and "off" switch power supply for the disintegration circuit and switch 59 is the "on" and "off" switch for starting and stopping the rotary cutting tool 25. Numeral 60 is a calibrated meter for indicating the r.p.m. of the cutter 25 and shaft 16. Conductors 61 and 62 connect the control board 55 to the power supply 63 which is connected by the conductors 64 and 65 to the motor 10. The disintegration circuit is completed to the line 44 by means of the line 66 and current transformer 67. The shaft 16a is shown as a solid shaft and such a shaft may be more desirable than the flexible shaft 16 in certain instances depending upon the particular job involved.

Figs. 8 and 9 illustrate the use of a modified cutter 25a and stopper ring 31a. The device of Figs. 8 and 9 would be useful for cutting tubes formed with a curve or radius. In this modification, the tube cutter 25a is changed in shape by adding a taper and the bumper 31a is also provided with a taper. With a tapered cutter as 25a the tube 30a can be cut at any place on its curved portion, as desired.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. An internal tube cutter comprising: a power drive means; a drive shaft; means operatively connecting said power drive means to said drive shaft; a cutting means flexibly connected to said drive shaft; said cutting means being mounted off center relative to said drive shaft whereby the cutting means will be moved into cutting engagement with a tube in which it is disposed when it is rotated; means for connecting one end of an electric power circuit to said drive shaft; and means for connecting the other end of the electric power circuit to the tube on which the cutter is working, whereby when the cutting means engages the tube an arc will be created and the tube will be disintegrated at the point of contact.

2. The invention as defined in claim 1, wherein: said shaft is a flexible shaft for its entire length.

3. The invention as defined in claim 1, wherein: said shaft is a solid shaft and is provided with a flexible connection portion for connecting the drive shaft to the cutting means.

4. The invention as defined in claim 1, wherein: said internal tube cutter is provided with means for conducting a coolant onto the cutting means.

5. The invention as defined in claim 1, wherein: said drive shaft is provided with an insulating covering.

6. The invention as defined in claim 1, wherein: said cutting means is provided with a means for limiting the outward movement of the same when it is rotated.

References Cited in the file of this patent

UNITED STATES PATENTS 2,263,412      Armentrout            Nov. 18, 1941